July 28, 1964 M. DAVIS ETAL 3,142,189
RATIO CONTROL FOR TOROIDAL TRANSMISSION
Filed Feb. 20, 1963 3 Sheets-Sheet 1

INVENTORS
MICHAEL DAVIS
CHARLES E. KRAUS
BY Julian Falk
ATTORNEY

INVENTORS
MICHAEL DAVIS
CHARLES E. KRAUS
BY
ATTORNEY

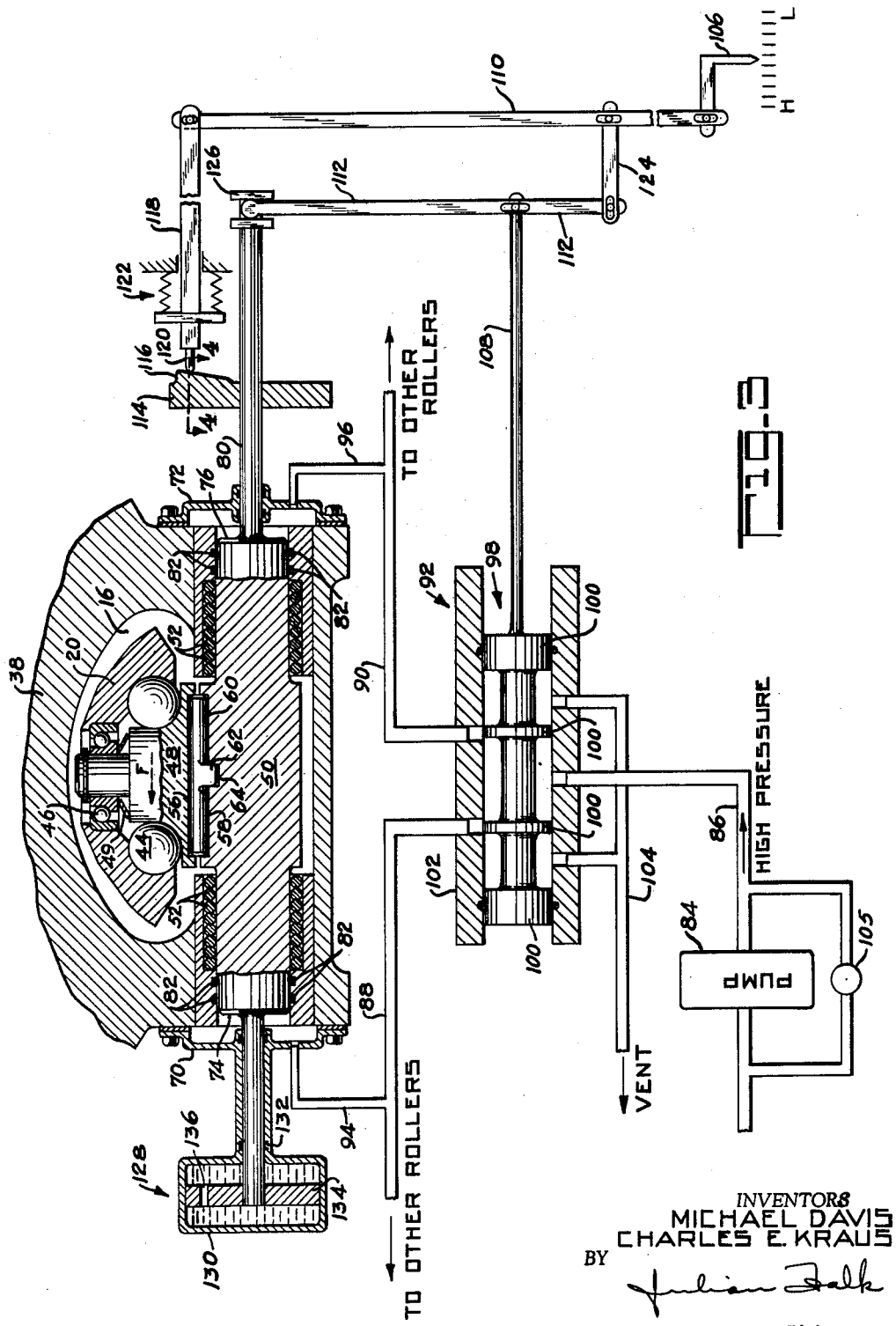

United States Patent Office 3,142,189
Patented July 28, 1964

3,142,189
RATIO CONTROL FOR TOROIDAL TRANSMISSION
Michael Davis, Caldwell, and Charles E. Kraus, Franklin Lakes, N.J.; said Davis assignor to Curtiss-Wright Corporation, a corporation of Delaware, and said Kraus assignor to Excelermatic, Inc., a corporation of New York
Filed Feb. 20, 1963, Ser. No. 259,982
13 Claims. (Cl. 74—200)

This invention relates to variable speed-ratio transmission and is particularly directed to stepless variable speed-ratio transmissions of the toroidal type.

In general such transmissions comprise a pair of drive members having facing toroidal or toric surfaces with a plurality of rollers disposed between and in driving contact with said surfaces and with each roller mounted for speed-ratio changing movement or precession of its axis of rotation to change the speed-ratio of the driving connection provided by the rollers between the toroidal members. The traction forces on each roller are balanced against a controllable hydraulic force such that any unbalance between said control force and the traction drive forces causes the roller to move in a manner inducing speed-ratio changing precession of the roller to a position in which the forces on said roller are again in balance. A transmission of this type is disclosed in United States Patent 3,008,337, issued on November 14, 1961.

In prior art transmissions of the toroidal type, as the rollers precess in response to a change in the control force opposing the traction forces, there is a tendency for the rollers to precess slightly beyond the desired roller position. The rollers in response to the traction forces will then tend to return to a position wherein the forces will be in balance but in so doing may precess slightly beyond this position in the opposite direction to the precession induced by the control force. Thus it can be seen that the rollers may precess slightly back and forth from the desired speed-ratio position. This movement of the rollers about the desired speed-ratio position is sometimes referred to as "hunting."

As shown in the aforementioned patent it has been known in the prior art to provide hydraulic control systems for adjusting the speed-ratio-position of the rollers. Also, as shown in the United States Patent 2,201,176, issued to Hayes, it is known to provide a feedback in response to roller speed-ratio changing movement for aiding in balancing the rollers in the desired speed-ratio position. However, this latter system is not satisfactory since "hunting" is not prevented. Thus, although the systems of prior art devices utilizing speed-ratio feedback tend to balance the speed-ratio position movement of the rollers, the rollers in moving to a new speed-ratio position are still subject to over-shooting said new position. Therefore, it can be seen that the prior art devices do not entirely eliminate "hunting" and as a result do not give satisfactory performance.

The primary purpose of the present invention is to provide a control system wherein a desired speed-ratio may be selected and wherein said selected speed-ratio will be held throughout the entire load range of the transmission. The present invention overcomes "hunting" of the rollers by providing a feedback system which acts in response to movement of the rollers in a second mode as well as in response to the roller speed-ratio changing movement so that, as the rollers approach the desired speed-ratio position they will stop and be held in the desired speed-ratio position.

Accordingly, it is one object of the invention to provide a novel means for controlling the precessional or speed-ratio changing movement of the rollers in a toroidal-type transmission.

It is a further object of the invention to provide a novel means for adjusting a hydraulic control system for controlling the precessional movement of the rollers in a toroidal-type transmission such that the rollers may be accurately set in a desired speed-ratio position and may be substantially maintained in said position.

An additional object of the invention is to provide a novel means for selecting a desired speed-ratio output in a toroidal-type transmission and for hydraulically-controlling the speed-ratio position of the rollers in accordance with said selection.

It is still another object of the invention to provide a novel feedback means for the control system in a toroidal-type transmission so that the rollers may be accurately set at a desired speed-ratio position and any deviation from said position will be picked up by said feedback means to alter said control system for substantially maintaining said rollers in said desired speed-ratio position.

Other objects and advantages of the invention will become apparent upon reading the annexed detailed description with the accompanying drawings in which:

FIG. 3 is a partial sectional view of one of the rollers with the control system of the invention being illustrated therein.

Figure 1:
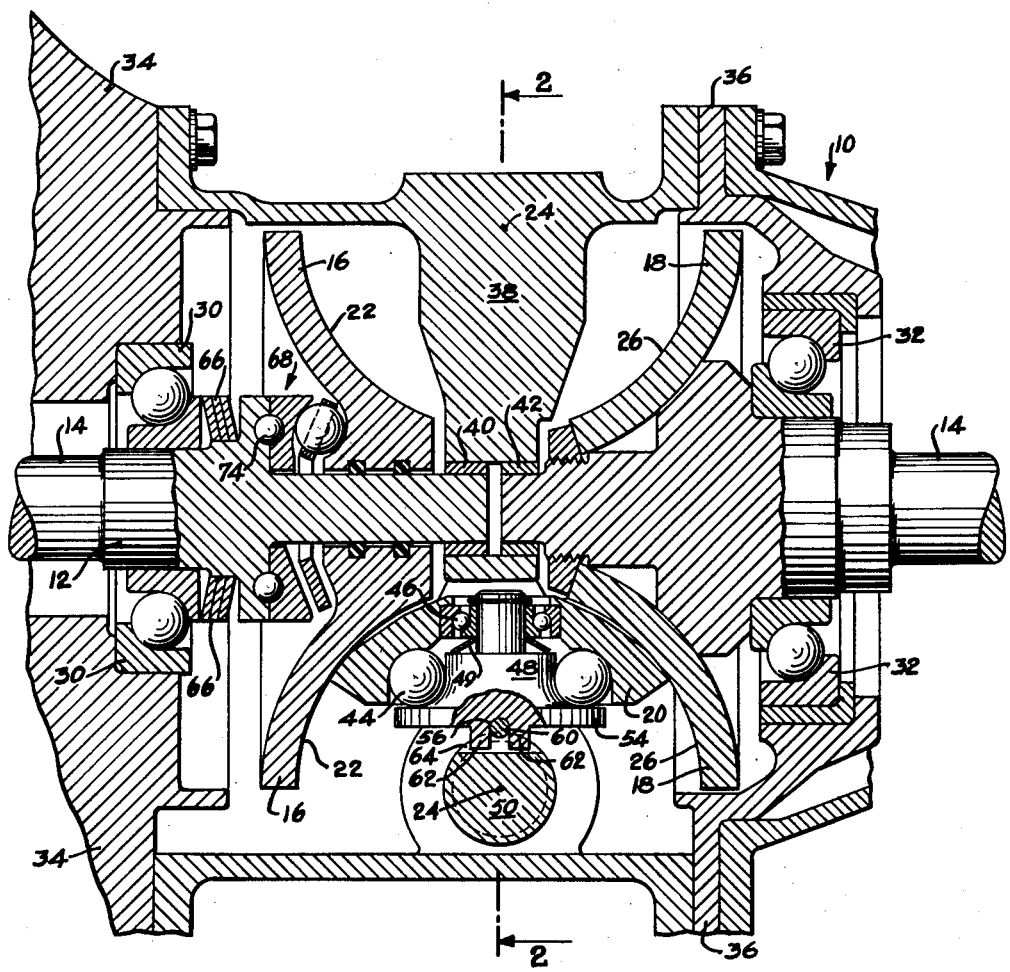
FIG. 1 is an axial sectional view of a toroidal-type transmission embodying the invention.

The transmission of the invention is intended for general application, as for example in automotive or industrial use, and is particularly adapted for use where a substantially constant speed-ratio output is desired over a wide variation in output load.

Referring to the drawings, the transmission 10, as illustrated, comprises co-axial input and output shafts 12 and 14 respectively, input and output toroidal disc members 16 and 18 co-axially mounted on and drivably connected to the shafts 12 and 14 respectively, and a plurality (three in the transmission shown) of circumferentially-spaced rollers 20 disposed between and in driving engagement with the toric surfaces of the disc members 16 and 18. At least one of the disc members 16 and 18 is axially movable toward the other and for this purpose the disc member 16 is illustrated as being supported on the input shaft 12 for axial movement thereon.

The input toroidal disc member 16 has a toroidal surface 22 which is preferably generated by rotating a substantially circular arc about the common axis of the input and output shafts 12 and 14, the center of the generating arc tracing the circle 24 as the toric surface 22 is generated. The output toroidal disc member 18 has a similar toroidal surface 26 facing the input toroidal surface 22 and has substantially the same toroidal center circle 24.

The shafts 12 and 14 are supported by bearings 30 and 32 in a multi-part housing including end sections 34 and 36 and an intermediate section 38 secured to said end sections. The intermediate housing section 38 is a Y-shaped frame structure between which the three rollers 20 are disposed, said Y-shaped structure providing end bearings 40 and 42 for the adjacent ends of the shafts 12 and 14.

Each roller 20 is journaled by bearings 44 and 46 on a spindle 48, said bearings of each roller 20 being designed to support their roller 20 against radial loads and to support their roller 20 against thrust radially outward relative to the transmission axis along its spindle 48. The axis of each roller spindle 48 lies substantially in a radial plane including the transmission axis. A spring 49, preferably in the form of a Belleville washer, is disposed between the inner race of the bearing 46 and a shoulder on the spindle 48 for reasons clearly disclosed in said aforementioned patent.

Each roller spindle 48 is supported by a pivot shaft 50 for speed-ratio changing movement of its respective roller about the axis of its said pivot shaft and relative to the toric surfaces 22 and 26 of disc members 16 and 18. Relative to the transmission axis, each roller 20 is disposed on the radially inner side of its associated pivot shaft 50. The axis of each pivot shaft 50 is substantially tangent to the toroidal center circle 24 and is disposed in a plane perpendicular to the transmission axis. Thus, the pivot shafts 50, like the rollers 20, are circumferentially spaced about the transmission axis.

Each pivot shaft 50 is journaled in bearings such as roller bearings 52, carried by the housing intermediate sections 38. Each roller spindle 48 has an end plate 54 having a substantially semi-cylindrical groove 56 facing a corresponding groove 58 in the surface of an enlarged central portion of its associated pivot shaft 50. Each such semi-cylindrical groove 56 and 58 is disposed parallel to the axis of its associated pivot shaft 50. A pin 60 is received in each facing pair of grooves 56 and 58 so that, through its pin 60, the associated roller 20 is supported by the shaft 50 for speed-ratio-changing movement of the roller with and about the axis of its shaft 50.

Pins 60 also permit a limited pivotal movement of their associated rollers 20 about the axis of each said pin to equalize the contact pressures of said roller against the toric surfaces 22 and 26.

As disclosed in said aforementioned patent, speed-ratio-changing movement may also be obtained through movements of each roller 20 in a second mode. As further explained in said patent, movements of the rollers in said second mode may be brought about by tilting each roller about an axis spaced from but parallel to a line through the points of contact of the roller with the toric surfaces or causing each roller to move linearly along a path parallel to the axis of its pivotal mounting means.

As stated above, each pivot shaft 50 has a limited movement along its axis and its associated roller spindle end plate 54 has tongues or lugs 62 received within a cross-slot or groove 64 in the shaft 50 so that movement of a shaft 50 along its axis results in a corresponding movement of its roller 20 in the same direction. Since the cross-slot 64 on each pivot shaft 50 is disposed at right angles to the adjacent pin 60, this engagement between each pivot shaft cross-slot 64 and the roller spindle lugs 62 does not interfere with limited pivotal movement of the associated roller spindle 54 about the axis of the pin 60 to equalize the contact pressures of the associated roller 20 against the toric surfaces 22 and 26.

As described above and as illustrated in FIG. 1, the input toroidal disc member 16 is axially moveable toward the output toroidal disc member 18 so that tight contact is maintained between the toroidal disc members and the rollers 20 positioned therebetween. For this purpose a Belleville washer type spring 66 acts through a cam and sprag device 68 for axially urging the toroidal disc member 16 toward the toroidal disc member 18. The details of the pre-load spring 66 and the cam and sprag device 68 will be best understood by referring to said aforementioned patent and form no part of the present invention. Other pre-load mechanisms may be used, for example, a hydraulic pre-loading mechanism.

Referring to United States Patent 3,008,337 and to United States Patent 3,048,047 issued on August 7, 1962, for example, it can be seen that the structure so far described may be considered conventional.

Figures 2, 4:
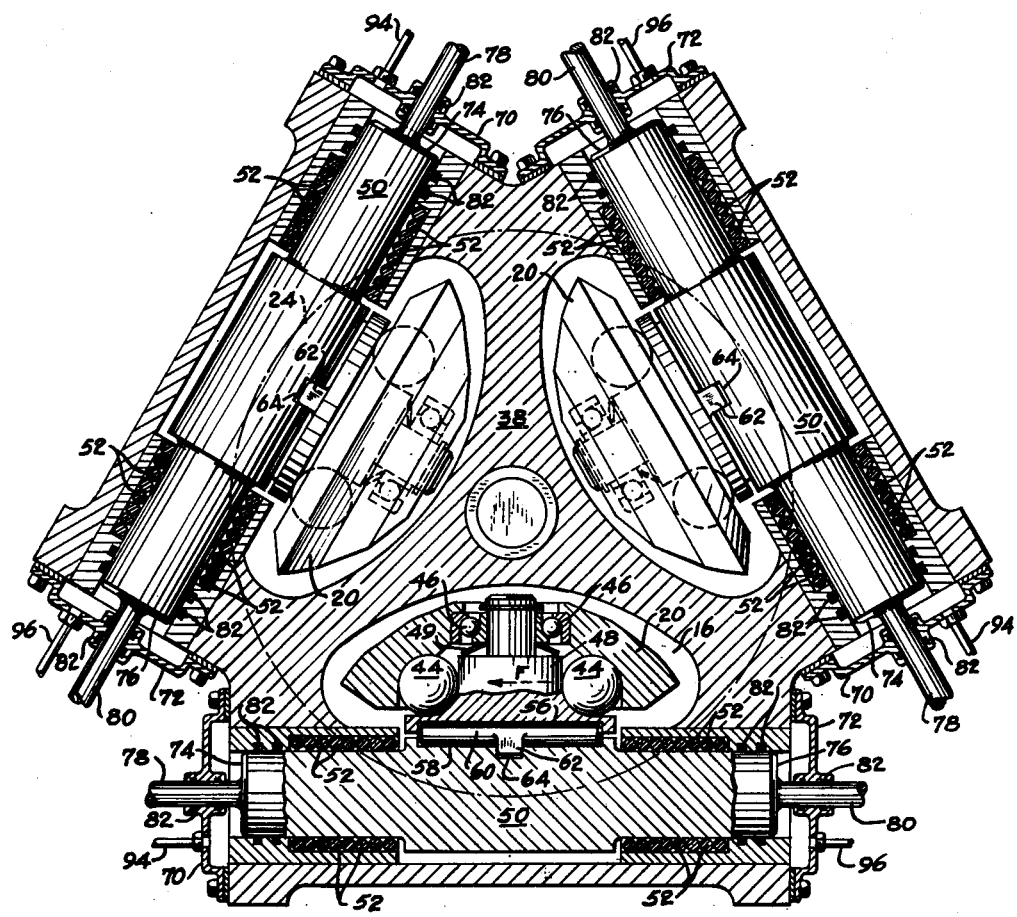
FIG. 2 is a sectional view taken along line 2—2 of FIG. 1.
FIG. 4 is a sectional view of the cam of FIG. 3 taken along line 4—4 of FIG. 3.

The direction of rotation of the transmission is such that as viewed in FIG. 2 the input toric member 16 rotates clockwise and therefore the traction forces F exerted by the toric members 16 and 18, on for example, the lower roller 20 are directed toward the left parallel to the axis of its pivot shaft 50. Any unbalance of the traction forces on a roller and the roller forces acting along and on its pivot shaft 50 results in movement of the roller and its pivot shaft 50 along the axis of said shaft. As fully explained in said United States Patent 3,008,337 such movement of a roller 20 along the axis of its pivot shaft 50 results in precession, or speed-ratio-changing pivotal movement of the roller about the axis of its pivot shaft 50 to a speed-ratio position in which said forces are again in balance.

In order to control the speed-ratio position of the rollers 20 a hydraulic control system is utilized through which controlled hydraulic pressure may be applied to each end of the pivot shaft 50 for causing said pivot shaft to translate along its axis in response to a differential in the pressure applied at its ends. For this purpose, as illustrated in FIG. 3, each roller may be provided with cylinders 70 and 72 adjacent the ends of its pivot shaft 50. The end faces 74 and 76 of each pivot shaft 50 serve as piston surfaces upon which the hydraulic force acts to cause the pivot shaft 50 to translate along its axis. Extending axially from each end of the pivot shaft 50 are shaft extensions 78 and 80 respectively, which pass through and beyond the cylinder walls, as shown in FIG. 3. The purpose of the shaft extensions 78 and 80 will be more fully explained below. Suitable seals 82 are provided between pivot shaft 50 and its bearing support and between shaft extensions 78 and 80 and the cylinder walls for preventing leakage of the hydraulic fluid from the cylinders 70 and 72.

For supplying hydraulic pressure to the cylinders 70 and 72 a pump 84 is provided, which may be a gear-type pump, and the pump 84 may be driven from the input shaft 12. The pump output is supplied to a conduit 86 which is operatively connected to conduits 88 or 90 through a servo-valve mechanism 92, said conduits 88 and 90 being suitably connected by branch conduits 94 and 96 to the cylinders 70 and 72 respectively, of each roller 20 for supplying hydraulic pressure thereto. In this way the same hydraulic pressure differential is applied across the ends of each roller pivot shaft 50.

The servo-valve mechanism 92 comprises a piston-type slide valve means and as illustrated in FIG. 3 may take the form of a piston 98 having a plurality of lands 100 thereon, said piston 98 being slidably mounted in valve housing 102. As the piston 98 is caused to move axially, the control pressure to the two cylinders 70 and 72 is regulated by the two intermediate lands 100 as they vary the valve openings in the valve housing 102, leading to conduits 88 and 90. In actual practice the working range of the servo valve is only a few thousandths of an inch. A vent line 104, which may lead to a suitable sump or reservoir is also suitably connected into the hydraulic system at the valve housing 102. A pressure relief valve designated at 105 may also be connected into the system, for example, between pump 84 and valve mechanism 92, for venting the high pressure line when the pressure in the line exceeds a desired level.

The valve mechanism, as illustrated in FIG. 3, is shown in a neutral position. In said neutral position the fluid pressure from conduit 86 flows through both conduits 88 and 90 due to the fact that the openings of conduits 88 and 90 in valve housing 102 slightly overlap the lands 100 at said openings and said lands close off said openings to the vent conduit 104. It is apparent, however, that any slight axial adjustment of the valve piston 98 will permit the fluid pressure to flow around one of the lands 100 to an opening of vent conduit 104 in valve housing 102 to vent one of the lines 88 or 90. Therefore, the fluid pressure on one of the pressure control conduits 88 or 90 will be reduced and the pivot shaft 50 will be forced to translate along its axis in response to the higher pressure supplied to the cylinder 70 or 72. Obviously, however, the fluid pressure to the cylinders 70 and 72 could also be varied by eliminating the vent conduit 104 in valve housing 102 and providing a fluid flow into the cylinders 70 and 72, with a restricted vent being provided in said cylinders. The servo valve 92 would then throttle the fluid flow through the cylinders 70 and 72 in accordance with the position of said valve piston 98 in the valve housing 102. Of course, it should be realized that the invention is not intended to be limited to the use of the piston-type valve illustrated and that any suitable valve means may be used for varying the fluid pressure flow to the cylinders, for example, a sliding plate valve.

As also shown in FIG. 3 a speed-ratio selector means having selector lever 106 is connected to the servo-valve piston shaft 108 through a floating-type linkage comprising link members 110 and 112. It is apparent therefore, that as the lever 106 is adjusted to a higher or lower speed-ratio selection, designated by speed-ratio indicating scale positions H and L on FIG. 3, the piston 98 will move axially and regulate the hydraulic pressure flowing through conduits 88 and 90 according to the adjustment of said lever. As hydraulic pressure is applied to one of the cylinders 70 and 72, as described above, the pressure will act on one of the faces 74 or 76 of pivot shaft 50 and if the forces on the roller parallel to the axis of said shaft are unbalanced said shaft will translate along its axis. As explained above and in said United States Patent 3,008,337 translation of the pivot shaft along its axis causes the rollers 20 to precess to a speed-ratio position in which the forces on said rollers will be in balance. Therefore, it can be seen that the speed-ratio position of the rollers 20 may be adjusted by varying the position of the selector lever. It is obvious, however, that the selector means may comprise either a manual or automatic means for varying the position of servo valve 92. It will also be apparent that means may be provided for causing the valve housing 102 to move with respect to valve piston 98 instead of moving valve piston 98 with respect to the stationary housing, as illustrated.

Each roller 20 in precessing to a new speed-ratio position pivots about the axis of pivot shaft 50 and causes the pivot shaft to likewise rotate about its axis. In order to aid in balancing the roller 20 in its new speed-ratio position, a first feedback system is provided which is responsive to the pivoting movement of one of the rollers 20 and its shaft 50. Since each roller is supplied with the same control pressure from conduits 88 and 90 and therefore moves to the same speed-ratio position, only one roller is needed to operate the feedback to the servo valve. The feedback system comprises a cam member 114 fixed to pivot shaft extension 80, said cam member having an inclined surface 116 (FIGS. 3 and 4) through which rotary movement of the shaft extension 80 and cam member 114 is translated to linear movement of the link member 118. The link member 118 has a cam follower pin 120 which abuts the cam surface 116 and a spring means 122 is connected to the link member 118 for maintaining the pin 120 in contact with the cam surface 116. It should be understood, however, that other means such as a rack and pinion may be used to convert the rotary motion of pivot shaft 50 to linear motion of link member 118. The link member 118 is operatively connected to the valve mechanism 92 by means of the floating-type linkage comprising link members 110, 124 and 112. The feedback system is so designed that an adjustment of lever 106 causing the valve piston 98 to move in one direction with resulting responsive precessional movement of roller 20 in a given direction, causes the feedback system to react through cam 114 to cause movement of valve piston 98 in a direction opposite to that resulting from the adjustment of lever 106, thereby tending to restore said valve piston to its original neutral position. Thus, the hydraulic force inducing the speed-ratio changing movement of roller 20 will be balanced through the speed-ratio responsive feedback system which by varying the position of the servo valve piston 98 tends to reduce the hydraulic pressure differential initially applied to induce the speed-ratio changing movement of the rollers.

It has been found, however, that with only the speed-ratio changing feedback system described above, the rollers 20 tend to precess beyond or overshoot the desired speed-ratio position. The rollers in response to the traction forces will then tend to return to the position wherein the forces will be in balance. However, as the rollers again approach the desired speed-ratio position, or the position wherein the forces will be in balance, they may again precess beyond or overshoot this position, but this time in the opposite direction. Thus, with the servo control system so far described, the rollers tend to hunt abut the desired speed-ratio position a substantial length of time before they may be stabilized at the desired position.

In order to prevent the rollers from hunting, as described above, a second feedback is provided. Attached to shaft extension 80 is a coupling member 126 having one end of link member 112 coupled thereto which allows for rotating movement of the shaft extension 80 with respect to link 112 and will also move axially with shaft extension 80 during translation of pivot shaft 50 along its axis. It is apparent therefore, that any axial or translational movement of pivot shaft 50 will cause an adjustment of the valve piston 98 which according to the structure illustrated in FIG. 3 is normally opposite to the adjustment induced by lever 106. After the axial translation movement of pivot shaft 50 is induced through an adjustment of lever 106, this movement activates the translational responsive feedback system which by transmitting said translational movements of the pivot shaft through link member 112 to the servo valve piston 98 will cause an opposite adjustment of valve piston 98 to restore supply pressure to the previously reduced pressure line. Thus, as the rollers precess to their new speed-ratio position, they will be effectively slowed up as they approach the desired speed-ratio position thereby tending to prevent the rollers from precessing by or overshooting said position.

Of course, as described above, the pivotal responsive feedback system also acts to vary the control pressure in response to speed-ratio-changing movement of the pivot shaft to balance the rollers in said desired speed-ratio position.

As also illustrated in FIG. 3 a damping mechanism 128 may be provided on the pivot shaft extension 78 for damping the precessional inducing movements of the roller 20. The damping mechanism may include a cylinder 130 having a damping fluid sealed therein, as for example by seals 132. The damping fluid may be of the type disclosed in United States Patent, 3,048,047 issued August 7, 1962. A piston 134 is supported on the end of shaft extension 78 and a transfer passage 136 is provided in the piston 134 for allowing restricted flow of the damping fluid between the faces of the piston 134. The details of the damping mechanism form no part of the present invention and any type damping mechanism may be utilized. Reference may be made to said above-mentioned United States Patent 3,048,047 for a more complete description of the operation of the damping mechanism.

While the invention has been set forth in detail in the above description, it is intended that the invention not be so limited and that it will be obvious to those skilled in the art that various changes and modifications may be made without departing from the spirit and scope of the invention.

We claim as our invention:

1. A variable speed transmission comprising co-axial input and output members having facing toric surfaces, a plurality of circumferentially-spaced rollers disposed between and in driving contact with said surfaces for transmitting torque from the input member to the output member, support means for each roller including pivot means providing for speed-ratio-changing pivotal movement of said roller across said toric surfaces, each roller support means also including means providing for movement of its roller in a second mode in response to changes in the traction forces between said roller and said toric surfaces such that in response to movement in said second mode said speed-ratio-changing pivotal movement of the roller is initiated, control means including a source of fluid pressure operatively connected to each roller support means for applying a fluid pressure force thereto for controlling movement of each roller in its said second mode thereby determining the speed-ratio position of said rollers, and means operatively connected to said control means for automatically varying said fluid pressure force in response to movement of said rollers in said second mode.

2. A variable speed transmission as recited in claim 1 further comprising means operatively connected to said control means for automatically varying said fluid pressure force in response to speed-ratio-changing movements of said rollers so that in combination with said means responsive to movements of said rollers in said second mode said rollers may be maintained substantially at a desired speed-ratio position.

3. A variable speed transmission as recited in claim 2 wherein each said roller pivot means comprises a pivot shaft moveable along its axis and connected to each roller such that speed-ratio-changing movement of said roller constitutes pivotal movement of the roller and its pivot shaft about the axis of said shaft and movement of the roller in its second mode constitutes translational movement of said roller and its pivot shaft in a direction along the axis of said shaft.

4. A variable speed-transmission as recited in claim 3 wherein said control means includes valve means for controlling the fluid pressure force to said roller support means and, means operatively connecting said valve means to said roller support means for applying an axial fluid pressure force to said roller support means for inducing translational movement of said roller pivot shafts.

5. A variable speed-transmission as recited in claim 4 wherein said control means further includes selector means for selecting a desired speed-ratio setting and said selector means being operatively connected with said valve means for initially positioning said valve means to induce movement of said roller pivot shafts in accordance with a desired speed-ratio selection.

6. A variable speed transmission as recited in claim 5 wherein said means for automatically varying said fluid pressure in response to movement of said roller in said second mode comprises means interconnected with at least one of said roller pivot shafts and said valve means for automatically varying the position of said valve means in response to movements of said one roller in said second mode with respect to said initial position determined by said selector means.

7. A variable speed transmission as recited in claim 5 wherein said means for automatically varying said fluid pressure force further comprises means operatively connected between one of said rollers pivot shafts and said valve means for automatically varying the position of said valve means in response to said speed-ratio-changing movements of said one roller pivot shaft with respect to said initial position determined by said selector means.

8. A variable speed transmission comprising co-axial input and output members having facing toric surfaces, a plurality of circumferentially-spaced rollers disposed between and in driving contact with said surfaces for transmitting torque from the input member to the output member, support means for each roller including pivot means providing for speed-ratio-changing pivotal movement of said roller across said toric surfaces, each roller support means also including means providing for movement of its roller in a second mode in response to changes in the traction forces between said roller and said toric surfaces such that in response to movement in said second mode said speed-ratio-changing pivotal movement of the roller is initiated, means including valve means for applying a hydraulic control force to each roller support means for controlling movements of the roller in its said second mode, means operable for moving said valve means in either of two directions to vary the hydraulic control force on each roller to cause speed-ratio-changing movements of the roller in a direction determined by the direction of valve movement, and means operatively interconnecting at least one of said rollers and said valve means so as to be automatically operative in response to speed-ratio-changing movement of said one roller to effect an opposite movement of said valve means and automatically operative in response to said roller movement in its said second mode also to produce said opposite valve movement.

9. A variable speed transmission as recited in claim 8 wherein each said roller pivot means comprises a pivot shaft moveable along its axis and connected to each roller such that speed-ratio-changing movement of said roller constitutes pivotal movement of the roller and its pivot shaft about the axis of said shaft and movement of the roller in its second mode constitutes translational movement of said roller and its pivot shaft in a direction along the axis of said shaft.

10. A variable speed transmission as recited in claim 9 wherein said means operatively interconnecting at least one of said rollers and said valve means includes a cam secured to the pivot shaft of said one roller and operatively connected to said valve means so that, speed-ratio-changing movement of said roller produces rotational movement of the cam to move the valve means in a direction to oppose said roller speed-ratio-changing movement.

11. A variable speed transmission as recited in claim 9 wherein said means operatively interconnecting at least one of said rollers and said valve means is operatively connected to the pivot shaft of said one roller.

12. A variable speed transmission as recited in claim 9 wherein said means operatively interconnecting at least one of said rollers and said valve means includes a cam secured to the pivot shaft of said one roller for joint movement therewith.

13. A variable speed transmission as recited in claim 9 wherein said means operatively interconnecting at least one of said rollers and said valve means includes a cam secured to the pivot shaft of said one roller, a follower for said cam, a floating link member having one portion connected to said cam follower, a second portion connected to the pivot shaft of said one roller for movement in response to translational movement of said pivot shaft, and a third portion connected to said valve means.

References Cited in the file of this patent

UNITED STATES PATENTS

| | | |
|---|---|---|
| 2,076,560 | Hayes | Apr. 13, 1937 |
| 2,201,176 | Hayes | May 21, 1940 |
| 3,048,047 | Richardson | Aug. 7, 1962 |
| 3,087,348 | Kraus | Apr. 30, 1963 |